US009510679B2

(12) United States Patent
Bhatt et al.

(10) Patent No.: US 9,510,679 B2
(45) Date of Patent: Dec. 6, 2016

(54) DRAWER MECHANISM

(71) Applicants: Ravi Nikhil Bhatt, Cupertino, CA (US); Mira Nicole Bhatt, Cupertino, CA (US); Joshua P. Kannankunni, Cupertino, CA (US); Clayton D. Stevens, Cupertino, CA (US); Logan Alastair John Wallace, Sunnyvale, CA (US); Olivia May Wallace, Sunnyvale, CA (US); Nikhil Mahesh Bhatt, Cupertino, CA (US); Alexander D. Wallace, Sunnyvale, CA (US); Seejo K. Pylappan, Cupertino, CA (US); Joseph J. Stevens, Cupertino, CA (US)

(72) Inventors: Ravi Nikhil Bhatt, Cupertino, CA (US); Mira Nicole Bhatt, Cupertino, CA (US); Joshua P. Kannankunni, Cupertino, CA (US); Clayton D. Stevens, Cupertino, CA (US); Logan Alastair John Wallace, Sunnyvale, CA (US); Olivia May Wallace, Sunnyvale, CA (US); Nikhil Mahesh Bhatt, Cupertino, CA (US); Alexander D. Wallace, Sunnyvale, CA (US); Seejo K. Pylappan, Cupertino, CA (US); Joseph J. Stevens, Cupertino, CA (US)

( * ) Notice: Subject to any disclaimer, the term of this patent is extended or adjusted under 35 U.S.C. 154(b) by 517 days.

(21) Appl. No.: 14/077,027

(22) Filed: Nov. 11, 2013

(65) Prior Publication Data
US 2014/0135994 A1    May 15, 2014

Related U.S. Application Data

(60) Provisional application No. 61/724,757, filed on Nov. 9, 2012.

(51) Int. Cl.
*G06Q 50/00*   (2012.01)
*G05B 15/02*   (2006.01)
*A47B 88/00*   (2006.01)
*G01G 21/23*   (2006.01)
*F16H 21/04*   (2006.01)

(52) U.S. Cl.
CPC ............... *A47B 88/00* (2013.01); *G01G 21/23* (2013.01); *A47B 2088/0081* (2013.01); *F16H 21/04* (2013.01); *Y10T 74/18168* (2015.01)

(58) Field of Classification Search
CPC combination set(s) only.
See application file for complete search history.

(56) References Cited

U.S. PATENT DOCUMENTS 2,859,083 A   11/1958 Devlin et al.
5,115,822 A   5/1992 Nichols
(Continued)

*Primary Examiner* — Brian Zimmerman
*Assistant Examiner* — Cal Eustaquio
(74) *Attorney, Agent, or Firm* — Joseph J. Stevens

(57) ABSTRACT

Embodiments of the present invention generally relate to a drawer lifting mechanism, and more particularly to a mechanism that is adapted to bring stored items that are disposed on a supporting surface of a drawer lifting mechanism to a user. The drawer lifting mechanism may be actuated by human power or by use of one or more actuators. In some configurations, the drawer lifting mechanism is disposed and used in the kitchen to enable the delivery of the contents of a kitchen cabinet to a user that is disposed proximate to the cabinet.

17 Claims, 12 Drawing Sheets

(56) References Cited

U.S. PATENT DOCUMENTS

| | | | | |
|---|---|---|---|---|
| 6,680,442 | B1* | 1/2004 | Rynd | G01G 19/445 |
| | | | | 177/140 |
| 7,628,461 | B2 | 12/2009 | Carden et al. | |
| 7,794,027 | B2 | 9/2010 | Calabria et al. | |
| 2004/0163687 | A1* | 8/2004 | Son | A47L 15/506 |
| | | | | 134/58 D |
| 2005/0093690 | A1* | 5/2005 | Miglionico | G01G 3/12 |
| | | | | 340/539.1 |
| 2008/0201174 | A1* | 8/2008 | Ramasubramanian | G06F 19/3456 |
| | | | | 705/3 |
| 2010/0051387 | A1* | 3/2010 | Krobot | B60R 3/02 |
| | | | | 182/158 |
| 2013/0304251 | A1* | 11/2013 | Garvey | G01N 29/225 |
| | | | | 700/213 |
| 2013/0325568 | A1* | 12/2013 | Mangalvedkar | G06Q 30/0269 |
| | | | | 705/14.4 |

* cited by examiner

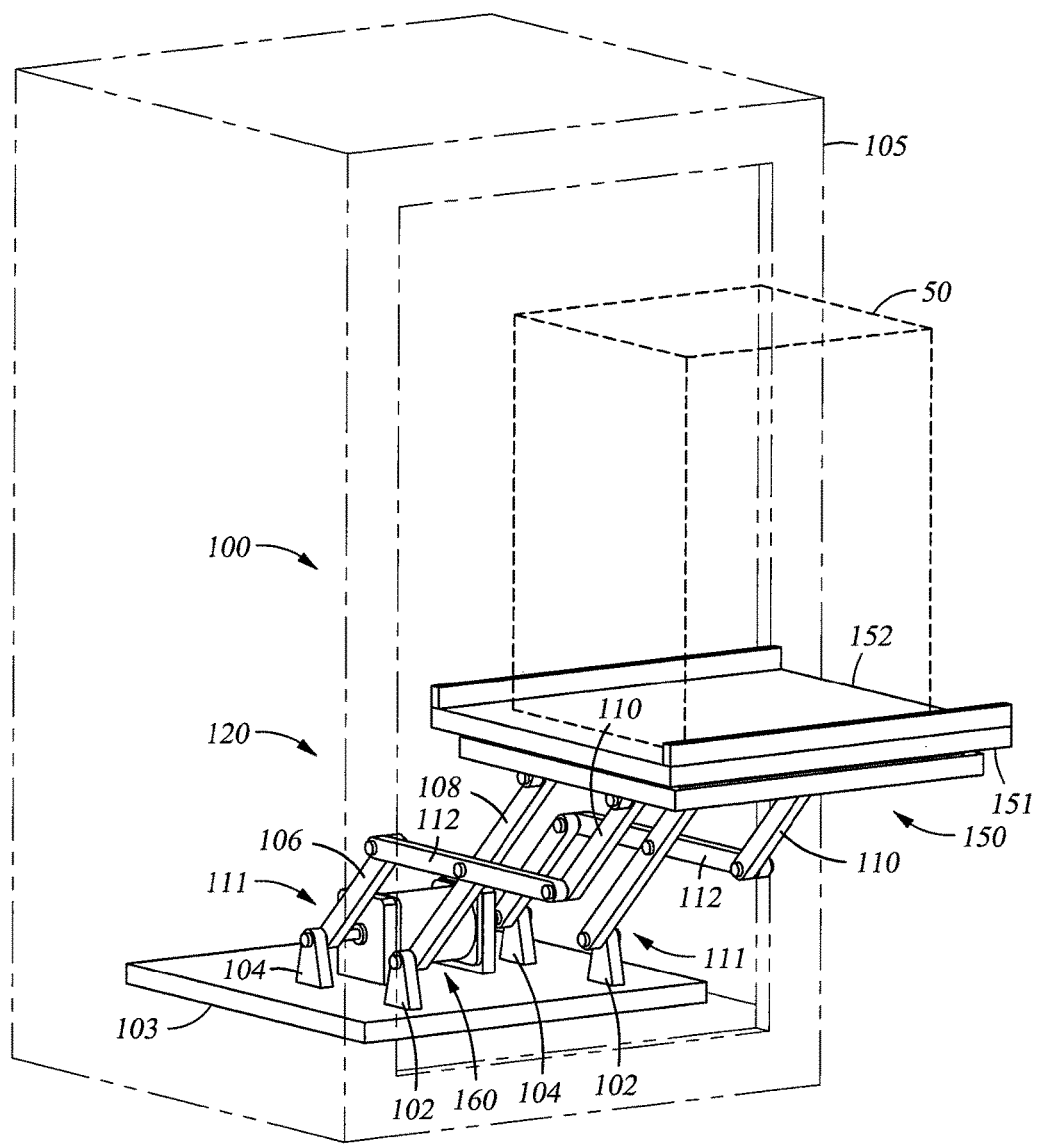
Fig. 2
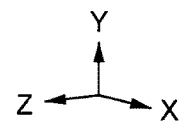

DRAWER MECHANISM

CROSS-REFERENCE TO RELATED APPLICATIONS

This application claims the benefit of U.S. Provisional Patent Application Ser. No. 61/724,757, filed Nov. 9, 2012, which is hereby incorporated herein by reference.

BACKGROUND OF THE INVENTION

Field of the Invention

Embodiments of the invention generally relate to a drawer lifting mechanism, and more particularly to a mechanism that is adapted to bring the supporting surface of a drawer to a user by use of a lifting mechanism.

Description of the Related Art

Due to advancements in medicine, the life expectancy of human beings has greatly increased in the last century. As human beings age, their ability to access objects that are near the extremities of their reach, either near their feet or above their head, can become challenging, due to their often reduced flexibility and reduced strength. For example, in the context of cabinet drawers in a kitchen, it can be hard for an individual that is standing to bend down to reach and lift the contents (e.g., pots, pans, food items, etc.) from a low drawer, due to the position of the drawer and the common ailments experienced by elderly individuals. Therefore, there is a need for an apparatus that will allow the contents of a drawer that is near an extremity of a person's reach to be positioned so that it can be more easily accessed.

The popularity of consumer electronics, such as tablet, laptops, smart phones, and PDAs, has increased dramatically in the past decade. As these devices have become familiar to the average user, the usefulness and the reliance on these types of devices has greatly increased. Therefore, there is also a need for an apparatus that provides access to the contents of a drawer and is able to interface with and receive commands from an electronic device and/or the internet.

SUMMARY OF THE INVENTION

Embodiments of the present invention generally relate to a drawer lifting mechanism, and more particularly to a mechanism that is adapted to bring stored items that are disposed on a supporting surface of the drawer lifting mechanism to a user.

Embodiments of the present invention may include an apparatus for positioning supported components, comprising a first drawer lifting mechanism that comprises two or more linkage structures that each comprise a plurality of linkage bars, a supporting member having a supporting surface, wherein the supporting member is disposed on or coupled to a first linkage bar of the plurality of linkage bars and a first actuator assembly having an output shaft that is coupled to a second linkage bar of the plurality of linkage bars, and is adapted to move the supporting member from a first position to a second position by changing the orientation of the second linkage bar. The apparatus may further include a system controller that is in communication with the first actuator, and comprises a processor and a weight sensing assembly that is configured to measure the weight of an object disposed on the supporting member and provide information relating to the measured weight to the system controller. The apparatus may further comprise a memory having stored therein a number of instructions which, when executed by the processor, causes the apparatus to perform operations comprising counting from a first time to a second time using a timing circuit, wherein the object is positioned on the weight sensing assembly while the timing circuit counts from the first time to the second time and generating the alarm when the difference between the first time and the second time exceeds a time value stored in memory, wherein generating the alarm comprises delivering an audio signal to a speaker or a visual prompt generated on a display coupled to the system controller. The apparatus may also further comprise a bar-code reading system that is configured to provide information about the object disposed on the supporting member when a bar code disposed on the object is scanned by the bar-code reading system, wherein the time value stored in memory is derived from the information provided from the bar-code reading system.

Embodiments of the present invention may further provide an apparatus for positioning supported components, comprising a first drawer lifting mechanism that comprises two or more linkage structures that each comprise a plurality of linkage bars, a supporting member having a supporting surface, wherein the supporting member is disposed on or coupled to a first linkage bar of the plurality of linkage bars and a first actuator assembly having an output shaft that is coupled to a second linkage bar of the plurality of linkage bars, and is adapted to move the supporting member from a first position to a second position by changing the orientation of the second linkage bar. The apparatus may also include a system controller that is in communication with the first actuator, and comprises a timing circuit and a processor, a weight sensing assembly that is configured to measure the weight of an object disposed on the supporting member and provide information relating to the measured weight to the system controller, a bar-code reading system that is configured to provide information about the object to the system controller when a bar code disposed on the object is scanned by the bar-code reading system and a memory. The memory may have stored therein a number of instructions which, when executed by the processor, causes the apparatus to perform operations comprising monitoring a characteristic of the object over a period of time and generating the alarm when the monitored characteristic exceeds a value stored in memory, wherein generating the alarm comprises delivering an audio signal to a speaker or a visual prompt generated on a display coupled to the system controller.

Embodiments of the present invention may further provide an apparatus for positioning supported components, comprising a first drawer lifting mechanism that comprises a base structure, two or more linkage structures, each of the linkage structures comprising a driven bar that is rotationally coupled to a driven axis, a first bar that is rotationally coupled to the base structure, a second bar that is rotationally coupled to the base structure, a third bar that is rotationally coupled to the first bar, the second bar and the driven bar and a fourth bar that is rotationally coupled to the first bar and the second bar, a supporting member that is disposed on the fourth bar, and having a supporting surface and a first actuator assembly having an output shaft that is coupled to the driven bar and is adapted to move the supporting member from a first position to a second position by changing the orientation of the driven bar. The apparatus may also include a system controller comprising a timing circuit, a first wireless transceiver and a processor, wherein the first wireless transceiver is in communication with a second wireless transceiver that is in communication with the first actuator assembly, a weight sensing assembly that is configured to measure the weight of an object disposed on the supporting member and provide information relating to the measured weight to the system controller, a bar-code reading system that is configured to provide information about the object disposed on the supporting member when a bar code disposed on the object is scanned by the bar-code reading system, and a memory. The memory may have stored therein a number of instructions which, when executed by the processor, causes the apparatus to perform operations comprising monitoring a characteristic of the object over a period of time and generating the alarm when the monitored characteristic exceeds a value stored in memory, wherein generating the alarm comprises delivering an audio signal to a speaker or a visual prompt generated on a display coupled to the system controller.

Embodiments of the present invention may further provide an apparatus for transferring supported components, comprising a base structure, two or more linkage structures, each of the linkage structures comprising a driven bar that is rotationally coupled to a driven axis, a first bar that is rotationally coupled to the base structure, a second bar that is rotationally coupled to the base structure, a third bar that is rotationally coupled to the first bar, the second bar and the driven bar, and a fourth bar that is rotationally coupled to the first bar and the second bar, a supporting member that is disposed on the fourth bar, and having a supporting surface, and an actuator assembly having an output shaft that is coupled to the driven bar and is adapted to move the supporting member from a first position to a second position by changing the orientation of the driven bar.

Embodiments of the present invention may further provide an apparatus for transferring supported components, comprising a base structure, two or more linkage structures, each of the linkage structures comprising a first bar that is rotationally coupled to the base structure, a second bar that is rotationally coupled to the base structure, a third bar that is rotationally coupled to the first bar, the second bar and the driven bar, and a fourth bar that is rotationally coupled to the first bar and the second bar, a supporting member that is disposed on the fourth bar, and having a supporting surface, and an actuator assembly that is coupled to the first bar, the second bar, the third bar and the fourth bar, and is adapted to move the supporting member from a first position to a second position by moving the first bar, the second bar, the third bar and the fourth bar.

Embodiments of the present invention may further provide an apparatus for transferring supported components, comprising a base structure that comprises a slide or rail having a first element that is configured to move relative to a second element, two or more linkage structures, each of the linkage structures comprising a driven bar that is rotationally coupled to a driven axis, a first bar that is rotationally coupled to the first element of the base structure, a second bar that is rotationally coupled to the first element of the base structure, a third bar that is rotationally coupled to the first bar, the second bar and the driven bar, and a fourth bar that is rotationally coupled to the first bar and the second bar, a supporting member that is disposed on the fourth bar, and having a supporting surface, and an actuator assembly having a pinion gear that is coupled to the driven bar and a rack gear that is in contact with the pinion gear, wherein the actuator assembly is adapted to move the supporting member from a first position to a second position when the first element of the base structure is translated relative to the second element of the base structure.

Embodiments of the present invention may further provide an apparatus for transferring supported components, comprising a base structure, two or more linkage structures, each of the linkage structures comprising a first bar that is rotationally coupled to the base structure, a second bar that is rotationally coupled to the base structure, a third bar and a fourth bar, the third bar being rotationally coupled to the first bar, the second bar and a fifth bar, the fourth bar being rotationally coupled to the second bar and the fifth bar, and the fifth bar being rotationally coupled to the third bar and the fourth bar, a supporting member that is coupled to the fourth bar, and having a supporting surface, and an actuator assembly that is coupled to the first bar and is adapted to move the supporting member from a first position to a second position by moving the first bar, the second bar, the third bar, the fourth bar and the fifth bar.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is an isometric view of a drawer lifting mechanism that is in its extended position in relation to the enclosure, according to an embodiment of the invention.

Figure 1:
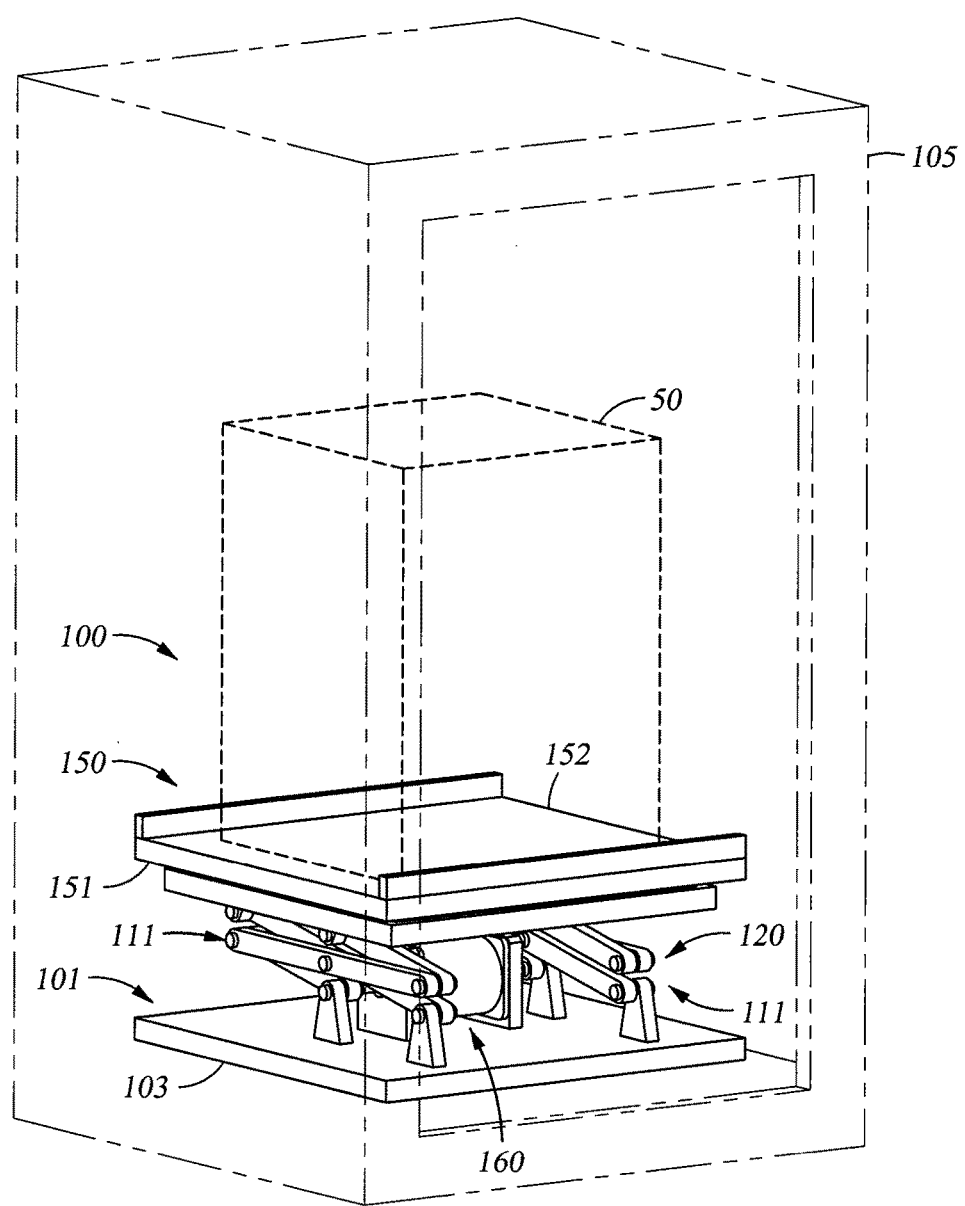
FIG. 1 is an isometric view of a drawer lifting mechanism that is in its retracted position within an enclosure, according to an embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present invention generally relate to a drawer lifting mechanism, and more particularly to a mechanism that is adapted to bring stored items that are disposed on a supporting surface of the drawer lifting mechanism to a user. The drawer lifting mechanism may be actuated by human power or by use of one or more actuators. In some embodiment, the one or more drawer lifting mechanisms are coupled to a controller that is adapted to control the movement of each of the drawer lifting mechanisms and in some cases analyze, inspect and/or provide useful information to the user regarding the contents disposed on the supporting surface. In some configurations, the drawer lifting mechanism is disposed and used in the kitchen to enable the delivery of the contents of a kitchen cabinet to a user that is disposed proximate to the cabinet.

Figure 3:
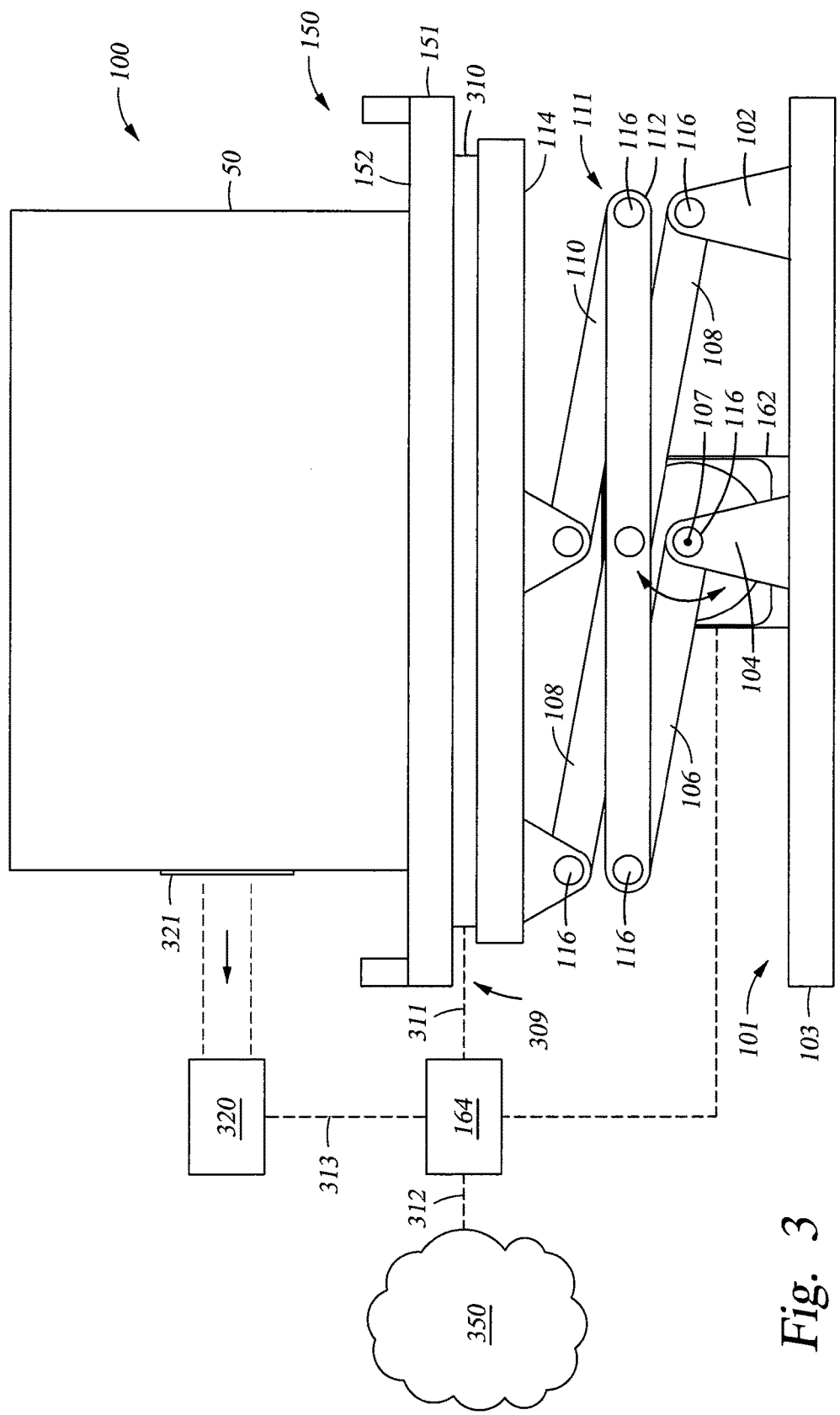
FIG. 3 is a side view of the drawer lifting mechanism in the retracted position, according to an embodiment of the invention.
Figure 4:
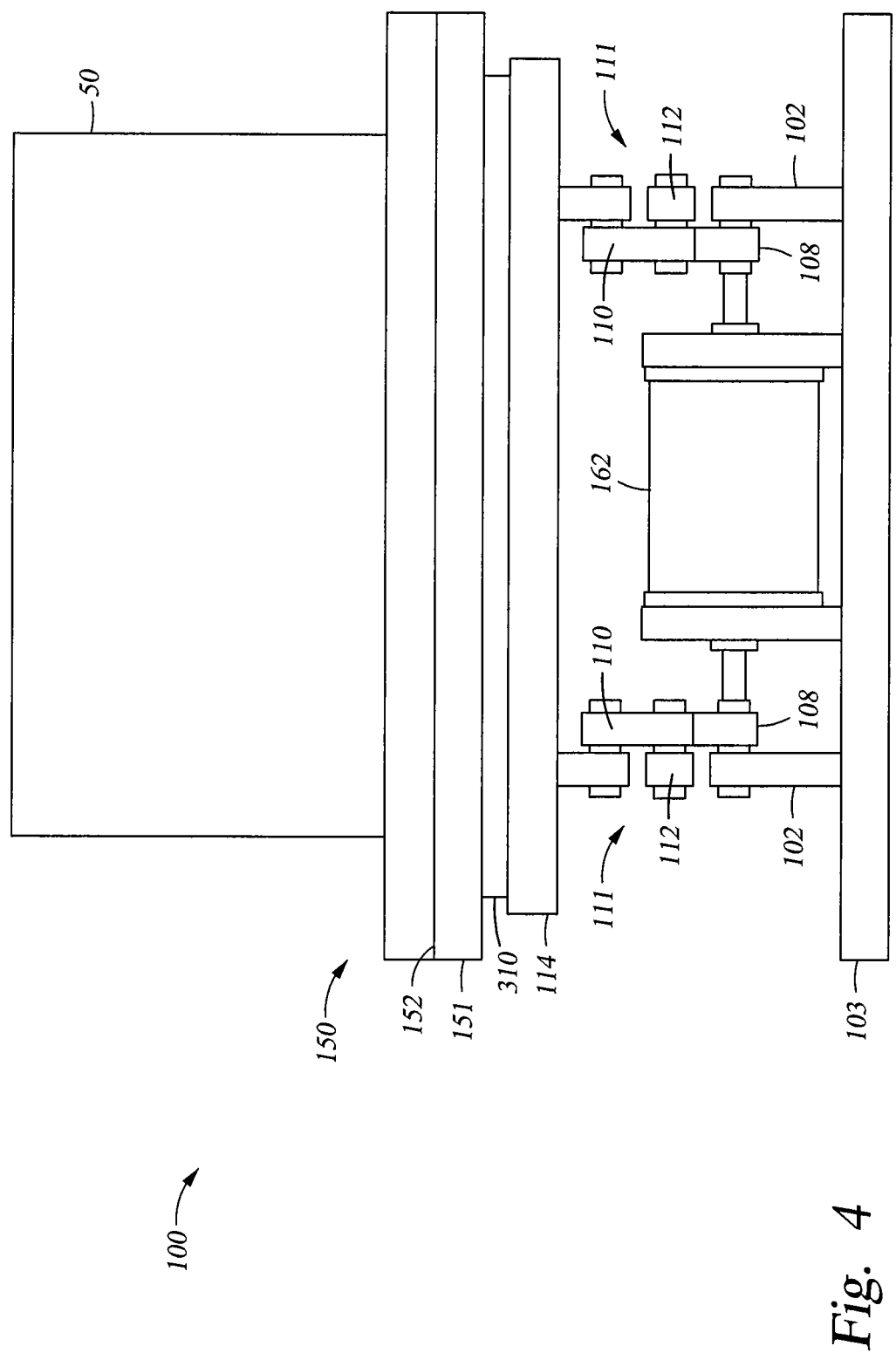
FIG. 4 is an end view of a drawer lifting mechanism in the retracted position, according to an embodiment of the invention.
Figure 5:
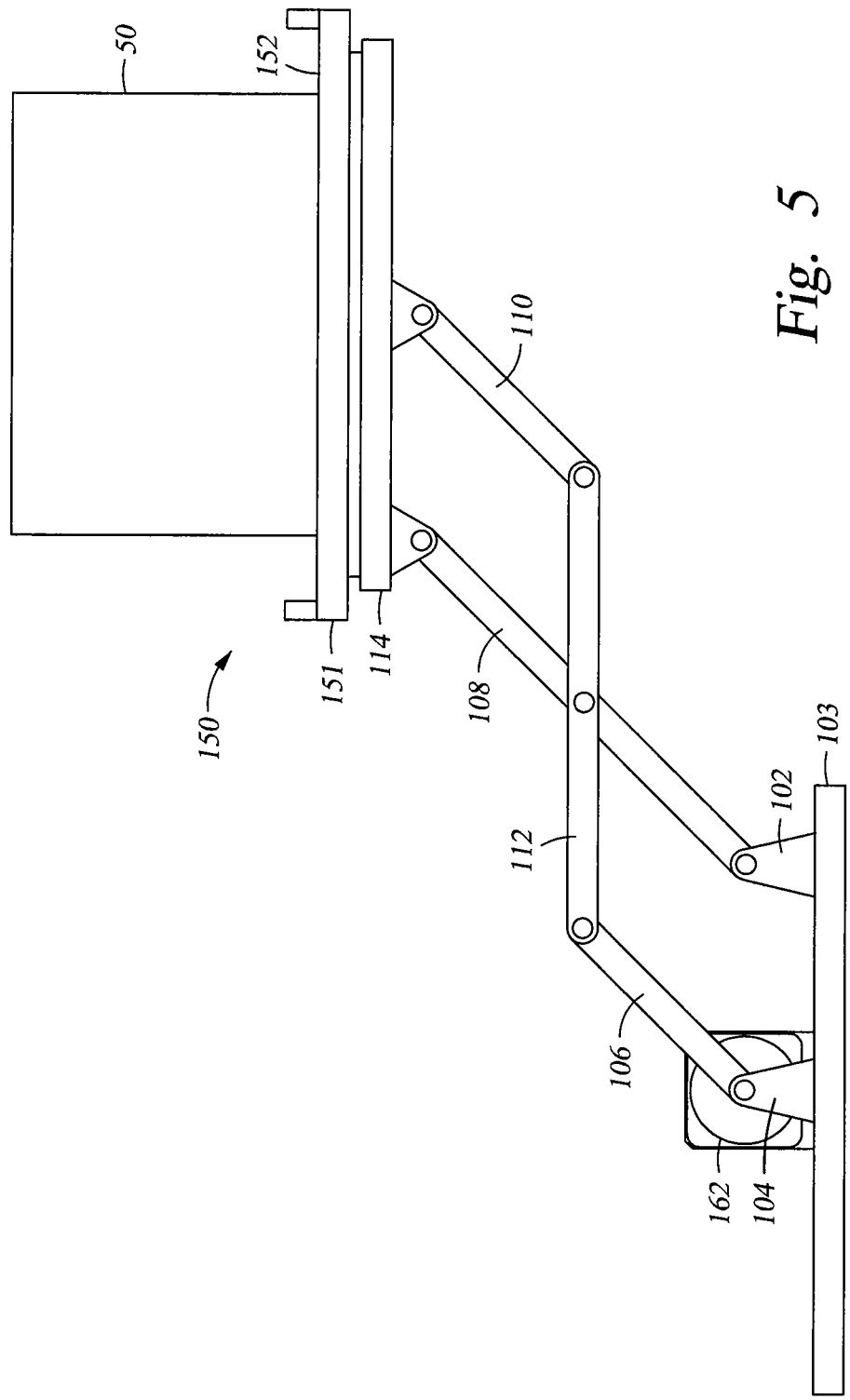
FIG. 5 is a side view of a drawer lifting mechanism in the extended position, according to an embodiment of the invention.
Figure 6:
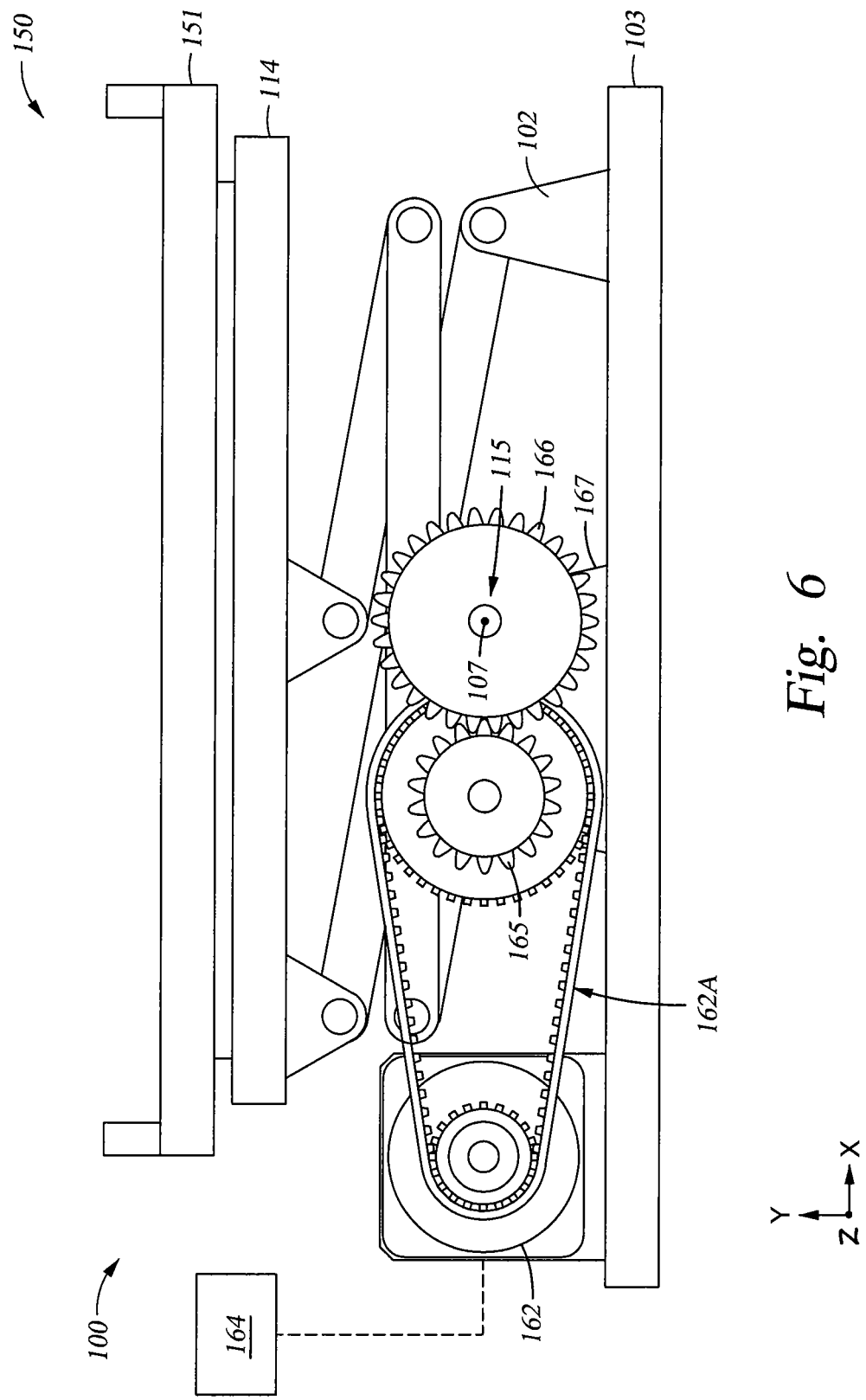
FIG. 6 is a side view of a drawer lifting mechanism in the extended position, according to an embodiment of the invention.

FIGS. 1 and 2 are isometric views of an embodiment of a drawer lifting mechanism 100 that is housed within an enclosing structure 105, such as a kitchen cabinet, desk drawer, supply cabinet, oven or other similar storage area. FIG. 1 illustrates the drawer lifting mechanism 100 in the retracted position, and thus the drawer lifting mechanism 100 and stored items 50 are positioned within the enclosing structure 105. FIG. 2 illustrates the drawer lifting mechanism 100 in the extended position, and thus the stored items 50 and at least a portion of the drawer lifting mechanism 100 are positioned outside of the enclosing structure 105, so that a person positioned proximate to the enclosing structure 105 can reach the stored items 50. The drawer lifting mechanism 100 is generally moved between the retracted position and extended position, and vice versa, by use of an actuating mechanism 160. FIG. 3 is a side view illustrating the various components of the drawer lifting mechanism 100 when they are in the retracted position, as also shown in FIG. 1. FIG. 4 is an end view of the drawer lifting mechanism 100 illustrating the various components of the drawer lifting mechanism 100 when they are in the retracted position. FIG. 5 is a side view illustrating the various components of the drawer lifting mechanism 100 when they are in the extended position, as also shown in FIG. 2. FIG. 6 is a side view illustrating the various components of the drawer lifting mechanism 100 when they are in the retracted position according to another embodiment of the invention described herein.

The drawer lifting mechanism 100 generally comprises a supporting member 150, a linkage structure 120 and the actuating mechanism 160, which are all supported by a base structure 101. The base structure 101 generally includes one or more structural elements that connect the drawer lifting mechanism 100 to the enclosing structure 105. The supporting member 150 generally comprises a supporting body 151 that has a supporting surface 152 on which the stored items 50 are placed and supported. The supporting body 151 is supported by and/or coupled to the linkage structure 120, and may comprise a structural element that is able to support the stored items 50. The supporting body 151 may comprise a molded plastic sheet, composite materials, plywood sheet, metal plate or other elements that can be adapted to support the contents of the drawer. The stored items 50 can be any useful component that is to be stored in the enclosing structure 105, for example in a kitchen or factory, the stored items 50 may include food items, paint, mechanical hardware, shipping packages, pots, pans, bowls and/or other useful items.

The linkage structure 120 generally comprises a plurality of interconnected structural members that are coupled together by fasteners, bearings, slides, rails and/or other interconnecting elements in such a way as to allow the motion of a driven shaft 115 to cause the linkage structure 120 to move the supporting member 150 in at least two orthogonal directions (e.g., X and Y directions in FIGS. 1 and 2) from a first position to a second position. In one example, the motion of the driven shaft 115 causes the linkage structure 120 to expand from the retracted position (FIG. 1) to the extended position (FIG. 2), which causes the supporting member 150 to move in the positive X and Y directions.

In one embodiment, the linkage structure 120 comprises two sets of multi-bar linkage structures 111 that can be coupled together by the supporting member 150, and one or more optional cross-connecting elements (not shown). Therefore, during operation the motion of the driven shaft 115 causes both of the multi-bar linkage structures 111 to move in unison to allow the supporting member 150 to be moved in at least two orthogonal directions (e.g., X and Y directions), while also preventing or minimizing the rotation of the supporting member 150 about the two orthogonal direction axes (i.e., rotation about the X and Y axes in FIGS. 1 and 2). In one embodiment, each of the multi-bar linkage structures 111 include a plurality of connected bars that are coupled to the base structure 101 and the supporting member 150. In one configuration, the plurality of connected bars include a driven bar 106, a first bar 108, a second bar 110, a third bar 112 and a fourth bar 114 that are coupled together by connecting components positioned at each connection point 116. The plurality of connected bars, such as the driven bar 106, first bar 108, second bar 110, third bar 112 and fourth bar 114, may each comprise a bar, rod, i-beam or other structural element that is formed from a structurally rigid material, such as a metal (e.g., aluminum, steel), plastic material, composite material, wood or other desirable structural material. In one configuration the supporting member 150 is disposed on and/or coupled to the fourth bar 114. The connection components each may include one or more journal bearings, roller bearings or other simple connection elements that are able to allow relative rotational movement between each pair of the connected bars, and support the load(s) created by the weight of the stored items 50 and any dynamic loads created during the movement of the drawer lifting mechanism 100 between the retracted position (FIGS. 1, 3 and 4) and the extended position (FIGS. 2 and 5).

In general, at least two of the connected bars, such as the first bar 108 and third bar 112, are each coupled to a portion of the base structure 101 by use of a connecting component found in a connection point 116. In one configuration, the base structure 101 includes a base 103, a front support bar 102 and a rear support bar 104 that are each positioned to connect to a different bar in each multi-bar linkage structures 111. In one configuration, each of the connecting bars (e.g., driven bar 106, first bar 108) in the multi-bar linkage structures 111 are coupled directly to the base 103, and thus the front and rear support bars 102, 104 are not used.

Referring to FIG. 5, in one embodiment, the driven bar 106 is coupled to and driven by the actuating mechanism 160 to cause the components in the drawer lifting mechanism 100 to move between the retracted position (FIGS. 1, 3 and 4) and the extended position (FIGS. 2 and 5). In one embodiment, the actuating mechanism 160 comprises an actuator 162 that is configured to cause the driven bar 106 to rotate about the driven axis 107 to cause the drawer lifting mechanism 100 to transition between the retracted position and the extended position and vice versa. The actuator 162 may be a servo motor, stepper motor, DC electrical motor, air cylinder or other similar mechanical device that is able to adjust and control the angular orientation of the driven bar 106 about the driven axis 107. In one configuration, the actuating mechanism includes a controller 164, which may comprise a general purpose computer, PLC or other similar device that is adapted to control the movement of the driven bar 106 by controlling the output of the actuator 162. In one configuration, the controller 164 is a simple pair of buttons that are each able to control the direction of the motion of the actuator 162, such as the clockwise and counter-clockwise motion of a geared AC electric motor or DC electric motor type of actuator 162.

In one example, during operation, a person may cause the drawer lifting mechanism 100 to move from the retracted position to the extended position by causing an electric motor type of the actuator 162 to change the orientation of the driven bar 106. In this case, the rotation of the output shaft of the electric motor is configured to cause the driven bar 106 to pivot about the driven axis 107, thus causing the driven bar 106 to rotate in a clockwise direction, as viewed from the side shown in FIG. 3. The rotation of the driven bar 106, which is coupled to the third bar 112 at a connection point 116, causes the third bar 112 to rotate about the Z axis and move in the X and Y directions, which cause the first bar 108 to pivot about the connection between the first bar 108 and the front support bar 102, and causes the second bar 110 and the fourth bar 114 to pivot about one of the connection points 116 and move in the X and Y directions. Therefore, the motion of the driven bar 106 causes the various components in each of the multi-bar linkage structures 111 to move the stored items 50 disposed on the supporting surface 152 of the supporting member 150 from the retracted to extended position.

In another embodiment, the motion of the actuator 162, such as the clockwise and counter-clockwise motion, is controlled by the opening or closing of a door (not shown) that covers an opening in enclosing structure 105, and thus encloses the drawer mechanism 100 within the enclosing structure 105. In this case, one or more sensors (e.g., reed switch, IR sensors, LVDT, optical sensor, magnetic contact, etc.) mounted on or coupled to a hinge that mounts the door to the enclosing structure 105 can be used to determine the direction of motion of the drawer mechanism 100. In one example, opening the door causes the sensor that is coupled to the hinge to detect the open position of the door, which causes the controller 164 to cause the drawer mechanism 100 to move to an extended position by use of the actuator 162. Similarly, moving an open door towards the closed position will cause the sensor coupled to the hinge to detect the change in position and cause the controller 164 to cause the drawer mechanism 100 to move to the retracted position.

In one embodiment, the base 103 includes two or more mechanical slides or rails that are each aligned parallel to each other and are separately attached to a multi-bar linkage structure 111. The mechanical slides or rails thus allow the drawer lifting mechanism 100 to be translated in at least one direction relative to the ground, such as the X-direction in FIGS. 1-2. The mechanical slide or rail may comprise one or more sliding members (e.g., roller bearings) that can be translated along a slot, bar, way or other guiding element which are well known in the art. In one configuration, two or more of the connected bars in a multi-bar linkage structure 111 are coupled to one or more of the sliding elements of the base 103, so that the drawer lifting mechanism 100 can be translated along the guiding element. A base 103 that allows the translation of the drawer lifting mechanism 100 can be useful to allow the appropriate positioning of the mechanism relative to the user or enclosing structure 105.

FIG. 6 illustrates an embodiment of the drawer lifting mechanism 100, in which an actuator 162 is coupled to a driven shaft 115 through at least two gears, such as gears 165, 166. In this configuration, the actuator 162 may be coupled to a support 167 and be positioned so that the gear 165, which is coupled to the output shaft of the actuator 162 via a belt system 162A, is configured to drive the second gear 166 that is coupled to the driven shaft 115. Therefore, during operation the actuator 162 is configured to drive the drive bar 106 at a desirable rotational speed, which is set by the gear ratio of the gears 165 and 166, belt system 162A and speed of the output of the actuator 162.

Therefore, in one embodiment of the invention, by causing the relative motion of at least one of the bar elements in the multi-bar linkage structure 111 by use of human power, electrical energy or other mechanical device, the contents of the stored items can be moved and disposed in any position between and including the retracted and extended positions.

In another embodiment of the drawer lifting mechanism 100, the actuating mechanism 160 simply comprises a rack and pinion gear system (not shown) that causes the change in orientation of the driven bar 106 during operation. In one example, a pinion gear (e.g., gear 166 in FIG. 6 when gear 165 is not present) is coupled to the driven shaft 115, which is disposed on the driven axis 107 and coupled to the driven bar 106, so that as the drawer lifting mechanism 100 is translated in a direction along a slide or rail (not shown) coupled to the base 103 and the ground on which the base 103 rests. In general, the slide or rail is oriented parallel to the X-Y plane aligned to an edge of the base 103. During operation the pinion gear rotates, due to the interaction of its gear teeth with the gear teeth of a stationary rack gear element (not shown) that is disposed parallel and adjacent to the X-Y plane edge of the base 103, causing the orientation of the driven bar 106 and other components in the multi-bar linkage structures 111 to change. The translation of the drawer lifting mechanism 100 along the slide or rail coupled to the base 103 can be caused by a human pulling or pushing the drawer lifting mechanism 100 along the slide or rail or by use of a linear actuator (e.g., linear motor, air cylinder). One skilled in the art will appreciate that the movement of the driven bar 106 may also be performed by driving the rack gear relative to the pinion gear or by use of another similar mechanical design without deviating from the scope of the invention described herein. For example, movement of the third bar 112 may occur due to a linear motion actuator couple thereto.

Figure 7:
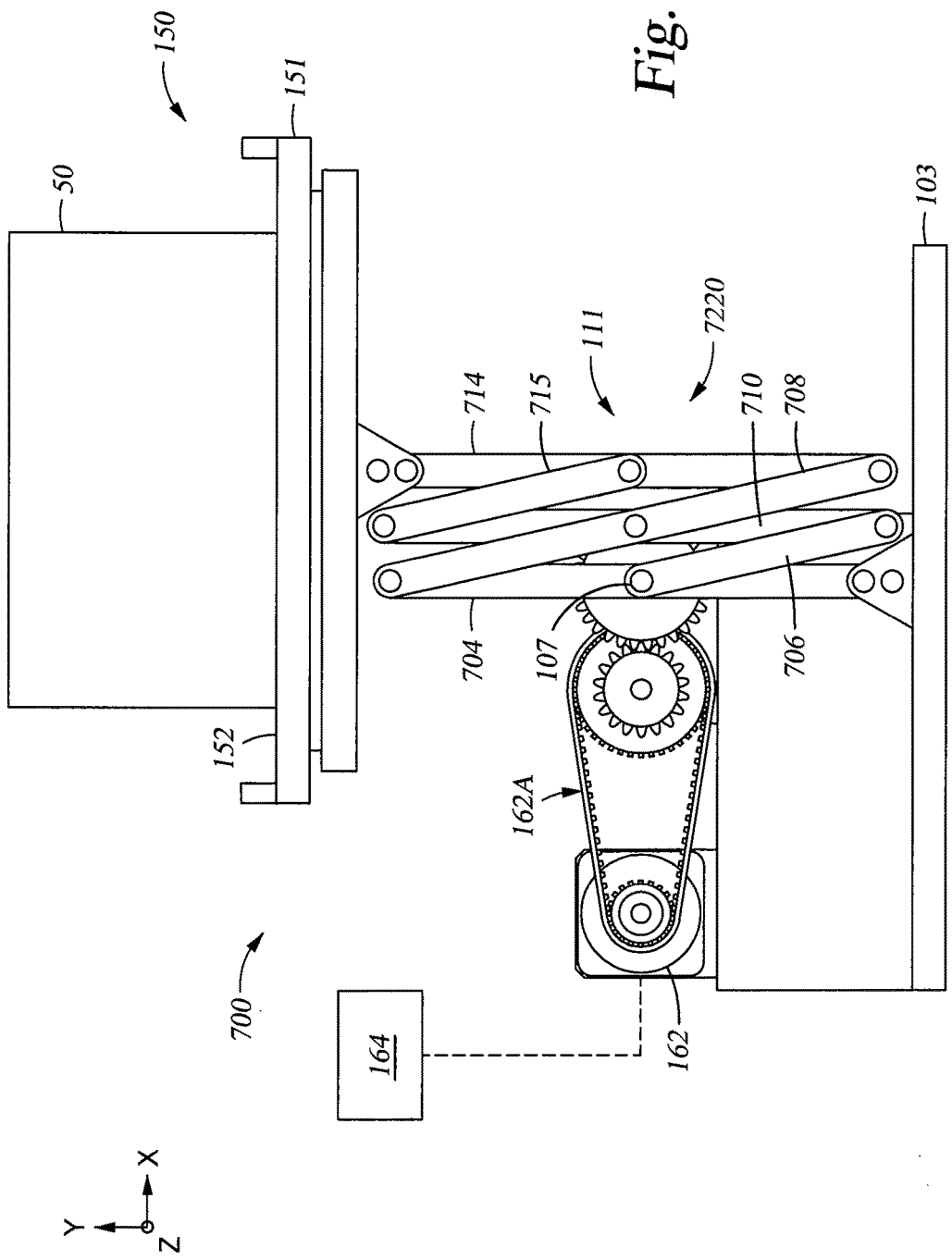
FIG. 7 is a side view of a drawer lifting mechanism that is in its retracted position, according to another embodiment of the invention.
Figure 8:
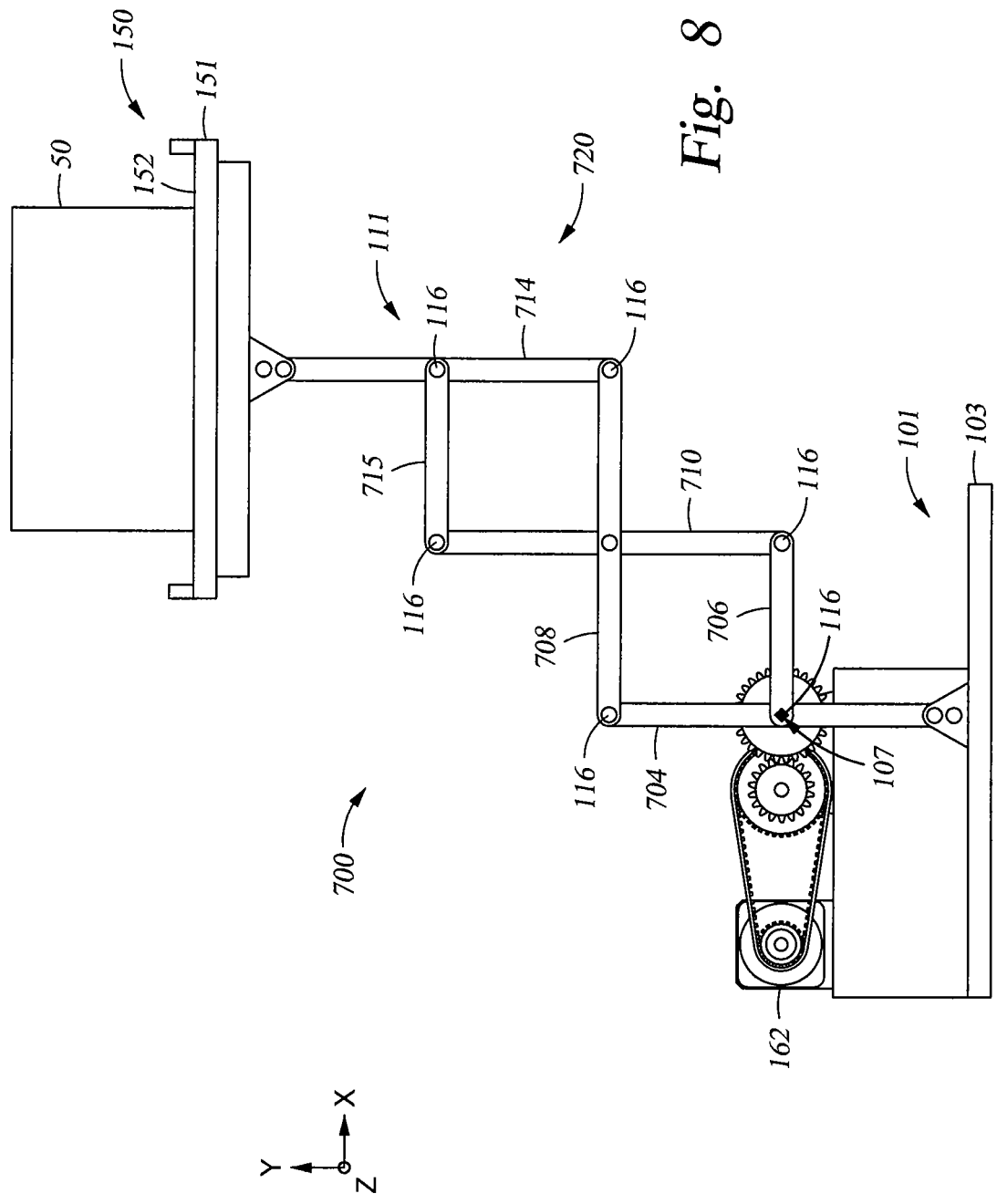
FIG. 8 is a side view of a drawer lifting mechanism that is in its extended position, according to another embodiment of the invention.

FIGS. 7 and 8 are side views of another embodiment of the drawer lifting mechanism 700 that is housed within an enclosing structure 105 (FIG. 7), which is discussed above. FIG. 7 illustrates the drawer lifting mechanism 700 in the retracted position, and thus the drawer lifting mechanism 700 and stored items 50 are positioned within an enclosing structure 105 (not shown). FIG. 8 illustrates the drawer lifting mechanism 700 in the extended position, and thus the stored items 50 and at least a portion of the drawer lifting mechanism 700 are positioned outside of the enclosing structure (not shown), so that a person positioned proximate to the enclosing structure 105 can reach the stored items 50. The drawer lifting mechanism 700 is generally moved between the retracted position and extended position, and vice versa, by use of the actuating mechanism 160, which is discussed above.

The drawer lifting mechanism 700 generally comprises the supporting member 150, a linkage structure 720 and the actuating mechanism 160, which are all supported by the base structure 101. The linkage structure 720 generally comprises a plurality of interconnected structural members that are coupled together by fasteners, bearings, slides, rails and/or other interconnecting elements in such a way as to allow the motion of a driven shaft 115 to cause the linkage structure 720 to move the supporting member 150 in at least two orthogonal directions (e.g., X and Y directions in FIGS. 7 and 8) from a first position to a second position. In one example, the motion of the driven shaft 115 causes the linkage structure 720 to expand from the retracted position (FIG. 7) to the extended position (FIG. 8), which causes the supporting member 150 to move in the positive X and Y directions.

In one embodiment, the linkage structure 720 comprises two sets of multi-bar linkage structures 111 that are spaced a distance apart and can be coupled together by the supporting member 150, and one or more optional cross-connecting elements (not shown). In one example, the multi-bar linkage structures 111 are thus used to support the supporting member 150 and stored items 50 disposed thereon, and may be similarly spatially positioned and connected together as the multi-bar linkage structures 111 shown in FIGS. 1-6.

During operation the motion of the driven shaft 115 causes both of the multi-bar linkage structures 111 in the linkage structure 720 to move in unison to allow the supporting member 150 to be moved in at least two orthogonal directions (e.g., X and Y directions), while also preventing or minimizing the rotation of the supporting member 150 about the two orthogonal direction axes (i.e., rotation about the X and Y axes in FIGS. 7 and 8). In one embodiment, each of the multi-bar linkage structures 111 include a plurality of connected bars that are coupled to the base structure 101 and the supporting member 150. In one configuration, the plurality of connected bars include a driven bar 706, a first bar 708, a second bar 710, a third bar 714 and a fourth bar 715 that are coupled together by connecting components positioned at each connection point 116, which are discussed above. The plurality of connected bars, such as the driven bar 706, first bar 708, second bar 710, third bar 714 and fourth bar 715 may each comprise a bar, rod, i-beam or other structural element that is formed from a structurally rigid material, as discussed above in conjunction with reference numerals 106-114. In one configuration the supporting member 150 is disposed on and/or coupled to the third bar 714. The connection components of the drawer lifting mechanism 700 are similar to the connection components discussed above in conjunction with FIGS. 1-6. In one configuration, at least two of the connected bars, such as the first bar 708 and driven bar 706, are each coupled to a portion of the base structure 101, such as the support bar 704, by use of a connecting component found in a connection point 116.

In one embodiment, the driven bar 706 is coupled to and driven by the actuating mechanism 160 to cause the components in the drawer lifting mechanism 700 to move between the retracted position (FIG. 7) and the extended position (FIG. 8). In one embodiment, the actuator 162 of the actuating mechanism 160 is adapted to cause the driven bar 706 to rotate about the driven axis 107 to cause the drawer lifting mechanism 700 to transition between the retracted position and the extended position and vice versa by use of a controller 164.

Generally, the controller 164 is configured to control the automated aspects of the drawer lifting mechanism 100. The controller 164 facilitates the control and automation of the overall system and may include a processor that generally includes a central processing unit (CPU) (not shown), memory (not shown), and support circuits (or I/O) (not shown). The controller 164 may also include a graphical user interface (GUI), a speaker, lights, and other components that can be used to provide information to the user. The CPU may be one of any form of computer processors that are used in industrial settings for controlling various processes and hardware (e.g., actuators, etc.) and monitor the state of the system (e.g., position of supporting member 150, process time, detector signals, etc.). The memory is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, sensors and the like. The controller 164 may include input/output circuitry that is able to communicate with external electronic devices (e.g., weight sensors, bar-code readers, lights, etc.) and the Internet, using wired or wireless transceivers using a desirable communication protocol. Since one or more components within the controller 164 can communicate with the internet, these components could also be field-upgradable as well using memory components that are rewritable (e.g., SRAM or EEPROM). A program (or computer instructions) readable by the controller 164 determines which tasks are performable at any given time. Preferably, the program is software readable by the controller 164, which includes code to generate and store at least supporting member 150 positional information, the sequence of movement of the various controlled components, and any combination thereof.

In one example, during operation, a person may cause the drawer lifting mechanism 700 to move from the retracted position to the extended position by causing an electric motor type of the actuator 162 to change the orientation of the driven bar 706. In this case, the rotation of the output shaft of the electric motor is configured to cause the driven bar 706 to pivot about the driven axis 107, thus causing the driven bar 706 to rotate in a clockwise direction, as viewed from the side shown in FIG. 7. The rotation of the driven bar 706, causes the third bar 714 to rotate about the Z axis, which cause the first bar 708 to pivot about the connection between the first bar 708 and the support bar 704, and causes the second bar 710 and the fourth bar 715 to pivot about one of the connection points 116 and move in the X and Y directions, which in turn cause the third bar 714 to pivot about one of the connection points 116 in the first bar 708 and the fourth bar 715 and move in the X and Y directions. Therefore, the motion of the driven bar 706 causes the various components in each of the multi-bar linkage structures 111 to move the stored items 50 disposed on the supporting surface 152 of the supporting member 150 from the retracted to extended position.

Figure 9:
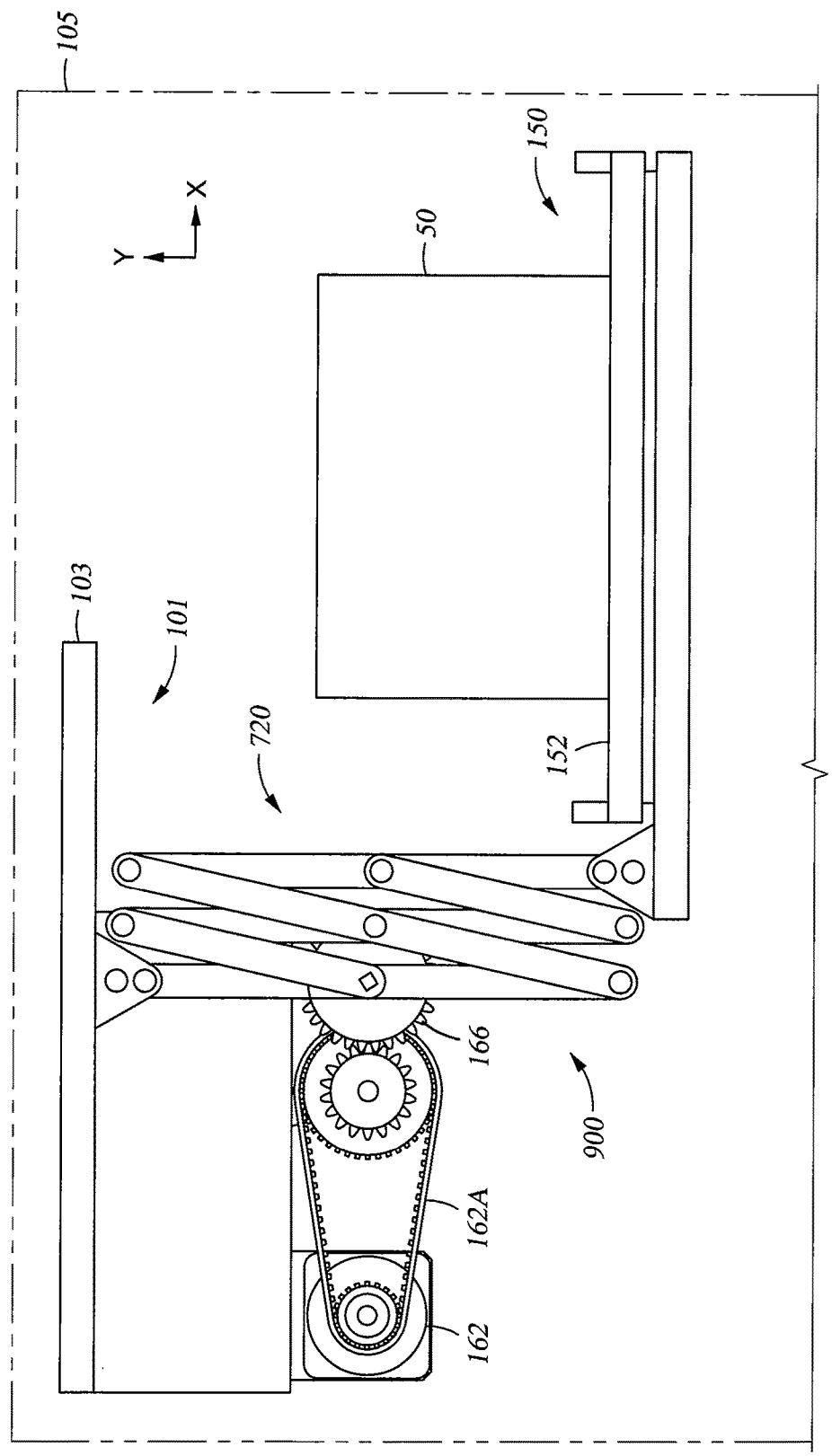
FIG. 9 is a side view of a drawer lifting mechanism that is in its retracted position, according to another embodiment of the invention.
Figure 10:
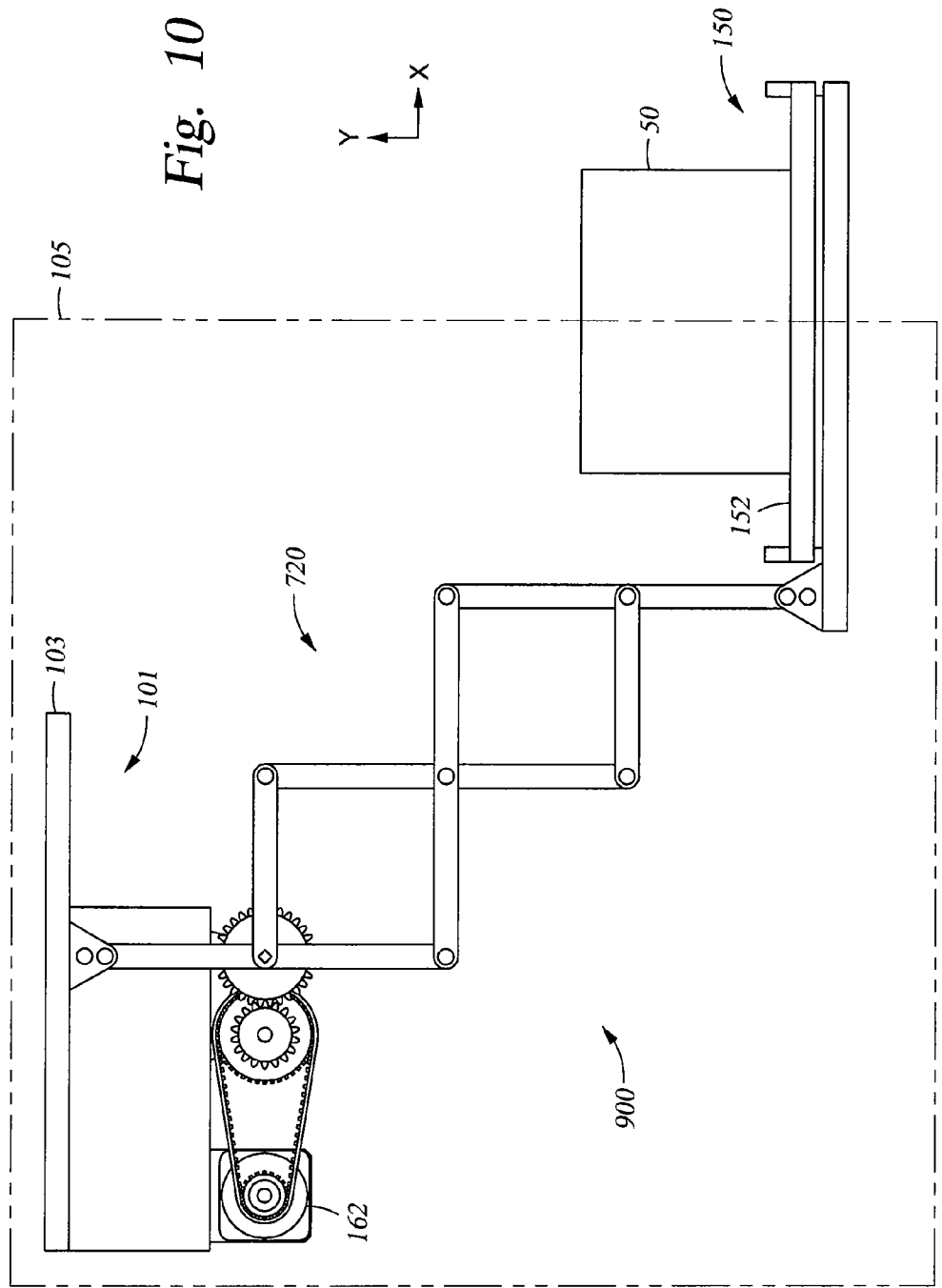
FIG. 10 is a side view of a drawer lifting mechanism that is in its extended position, according to another embodiment of the invention.

In another embodiment, a drawer lifting mechanism 900, which contains the same components as the drawer lifting mechanism 700 discussed above, is used to aid in the delivery of stored items 50 that are near the extents of a person's reach above their head. In this configuration, the motion of the driven shaft 115, due to the motion of the actuating mechanism 160, causes the linkage structure 720 to expand from the retracted position (FIG. 9) to the extended position (FIG. 10), which causes the supporting member 150 to move in the positive X direction and negative Y direction. FIG. 9 illustrates the drawer lifting mechanism 900 in the retracted position, and thus the drawer lifting mechanism 900 and stored items 50, which is disposed on the supporting surface 152, are positioned within the enclosing structure 105. FIG. 10 illustrates the drawer lifting mechanism 900 in the extended position, and thus the stored items 50 and at least a portion of the drawer lifting mechanism 900 are positioned outside of the enclosing structure (not shown), so that a person positioned proximate to the enclosing structure 105 can reach the stored items 50.

During operation, in one example, a person may cause the drawer lifting mechanism 900 to move from the retracted position to the extended position by causing an electric motor type of the actuator 162 to change the orientation of the driven bar 706. In this case, the rotation of the output shaft of the electric motor is configured to cause the driven bar 706 to pivot about the driven axis 107, thus causing the driven bar 706 and third bar 112 to rotate in a clockwise direction, as viewed from the side shown in FIG. 9. The rotation of the driven bar 706 cause the first bar 708 to pivot about the connection between the first bar 708 and the support bar 704, and causes the second bar 710 and the fourth bar 715 to pivot about one of the connection points 116 and move in the X and Y directions, which in turn cause the third bar 714 to pivot about one of the connection points 116 in the first bar 708 and the fourth bar 715 and move in the X and Y directions. Therefore, the motion of the driven bar 706 causes the various components in each of the multi-bar linkage structures 111 to move the stored items 50 disposed on the supporting surface 152 of the supporting member 150 from the retracted to extended position, which is lower than the retracted position so that the user can more easily reach the stored items 105.

One skilled in the art will appreciate that any of the multi-bar linkage structures 111 discussed herein may comprise two or more bar elements that are coupled together to cause the components within the drawer lifting mechanism 700 to move between the retracted and extended positions, and vice versa, by use of the actuating mechanism 160. One skilled in the art will appreciate that the actuating assemblies 160 in FIGS. 7-10 may comprise a rack gear and pinion gear actuator design, which is discussed above. In some embodiments, a multi-bar linkage structure 111 may include one or more position sensors (e.g., potentiometric position sensors, capacitive position sensors, LVDTs, Hall effect sensors, optical sensors, etc.) that are each adapted to detect at least one position of the multi-bar linkage structure 111 during its operation.

Figure 11:
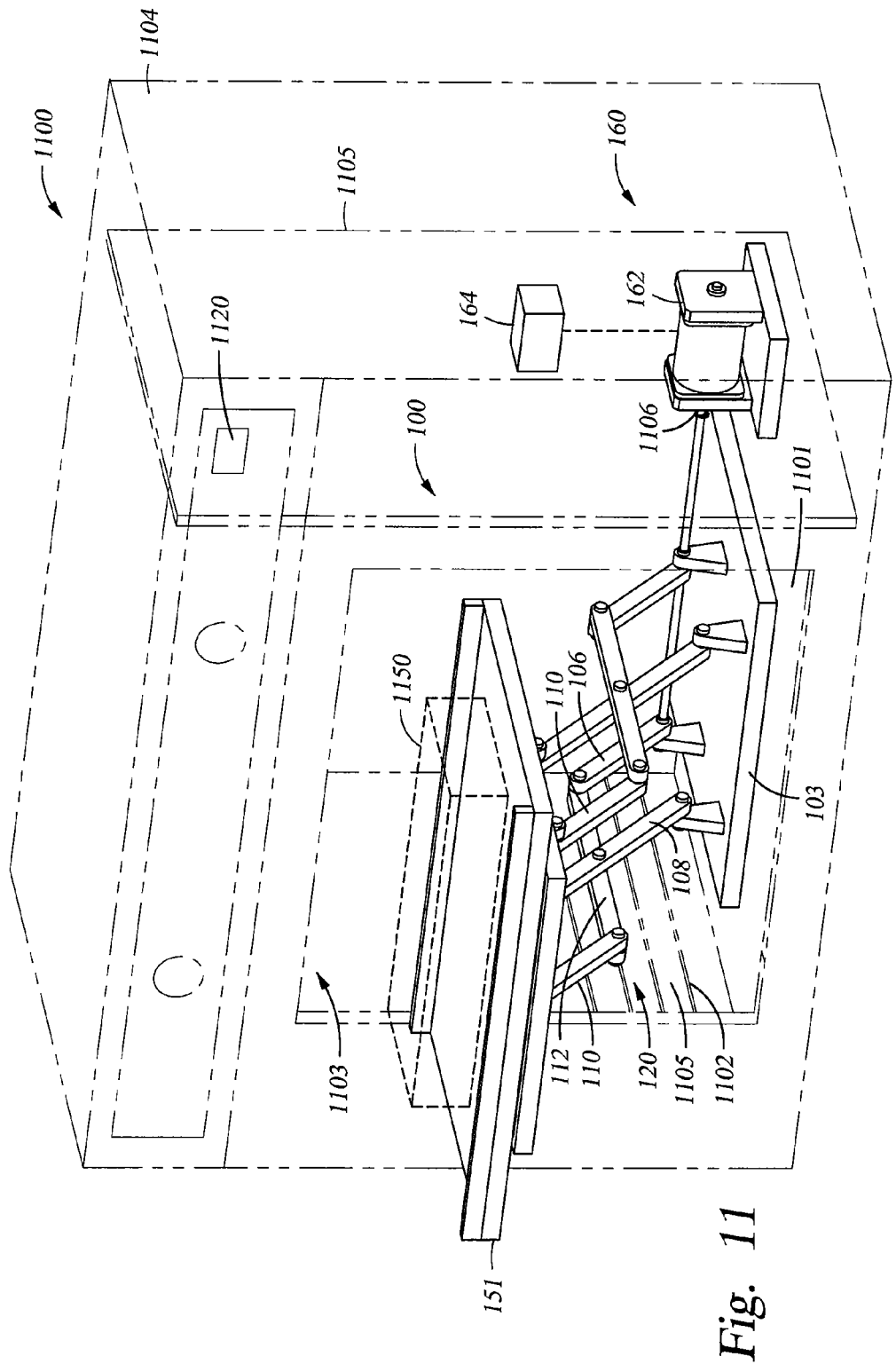
FIG. 11 is an isometric view of a drawer lifting mechanism that is in its extended position and is disposed in an oven, according to another embodiment of the invention.

In one embodiment, as illustrated in FIG. 11, the drawer lifting mechanism 100 is housed within an enclosing structure 105 that has one or more components that a user would not want to come into contact with during its normal operation. In one example, the enclosing structure comprises an oven 1100 that can be heated to temperatures above ambient temperature. FIG. 11 is an isometric view of a portion of an oven 1100 that has a partial cut-away section on the side 1104 of the oven 1100 to show one possible position of one or more of the components in the drawer lifting mechanism 100. One will note that the enclosing door of the oven 1100 has been removed for clarity reasons. In this configuration, the drawer lifting mechanism 100 is used to insert and remove items 1150 from a processing region 1101 (e.g., heated region) of the oven 1100. Thus, the drawer lifting mechanism 100 is used to keep the user from coming into contact with the heating elements 1103 and heated supporting components, such as the rack elements 1102, while allowing the easy removal and insertion of the heated or to be heated items 1150 in the processing region 1101. In general, the drawer lifting mechanism 100 in this configuration may include the linkage structure 120, the actuating mechanism 160, the controller 164, and the supporting member 150, which are all discussed above. The actuator 162 and controller 164 are disposed outside of the processing region 1101 and are insulated from the processes performed in the oven 1100 by an internal wall 1105. An actuation button 1120 on the oven 1100 may be used to cause the controller 164 to cause the insertion and removal of item 1150 from the processing region 1101 of the oven 1100. The actuator 162 may be coupled to the driven bar 106 within the linkage structure 120 through an opening 1106 within the internal wall 1105 so as to provide motion to the elements in the linkage structure 120. In some embodiments, the bars (e.g., bars 106, 108, 110) and connection components, which are used to connect the various bars (e.g., bars 106, 108, 110), are formed from a metal, ceramic or other heat resistant material. In one example, the bars are formed from a steel material and each of the connecting components include one or more ceramic bearings or bushings that are able to withstand the temperatures found within the heated region during processing.

Drawer Lifting System Examples

In one embodiment, the drawer mechanism 100 includes a weight sensing device assembly 309 that is used by the drawer mechanism 100 to determine if the stored items 50 are too heavy to be moved by the actuating assembly 160. In one configuration, as illustrated in FIG. 3, the weight sensing device assembly 309 includes a weight sensor 310 that is physically coupled to supporting member 150 so that it can measure the weight of at least one stored item 50 and is in communication with controller 164 via a communication link 311. The communication link 311 may be a wired or wireless communication link that is formed by two or more transceivers that are adapted to communicate using a desirable protocol (e.g., Bluetooth classic, BTLE, etc.) and are coupled to the weight sensor 310 and controller 164. In one example, the weight sensor 310 is a piezoelectric sensor, load cell or other similar type of sensor that is adapted to measure weight and provide an input to the controller 164.

In another embodiment, the drawer mechanism 100 uses the weight sensing device assembly 309 and controller 164 to regularly monitor and/or track the weight of the stored items 50 disposed on the supporting member 150 to determine if one or more of the stored items needs to be ordered and/or replaced. During operation a user may either zero the measured weight of the stored item 50 measured by the sensor 310 or store the measured weight of the stored item 50 in the memory of the controller 164 when it is initially placed on the supporting member 150. Next, the controller 164 will then regularly measure the weight of the stored item 50, and compare the measured weight with a desired weight that is also stored in the memory of the controller 164. The desired weight can be a percentage of the starting weight (e.g., 10-20% of the initial weight) and an alarm can be set in the controller 164, so that the user knows when the stored item may need to be replaced when the desired weight is reached. The controller 164 can warn the user that the desired weight has been reached via an audible and/or visual prompt (e.g., blinking light, message on GUI of the controller, etc.) provided by the I/O components in the controller 164.

In one embodiment, the controller 164 may be coupled to a bar-code reading system 320 that is adapted to scan and/or read a bar code 321 found on the stored item 50 and then deliver the retrieved information to the controller 164 via a communication link 313. The link 313 may be a wired or wireless communication link that is formed between the controller 164 and the bar-code reading system 320. The bar-code reading system 320 can be used to determine aspects of the stored items 50 disposed on the supporting member, such as its weight, cost, shelf life, SKU number information, size, brand, flavor and other useful information. The acquired information may be received using information stored in the memory of the controller 164 or by analyzing information received about the stored item 50 via an Internet link 312. The Internet link or Internet connection can be made using wireless, cable, satellite or other useful technique that is made with one or more transceivers found in the controller 164. The information received from the bar-code reading system 320 may be stored in the memory of the controller 164 for use and comparison with the other information stored therein.

In one embodiment, the controller 164 is configured to monitor the passage of time so that when the shelf life of a stored item is reached it can warn the user via an audible and/or visual prompt (e.g., blinking light, message on GUI of the controller, etc.) provided by the I/O components in the controller 164. The passage of time measured by the controller 164 may be measured using a timing circuit found in the controller 164. The timing circuit may include a convention IC type clock that may contain a crystal oscillator to produce a timing signal that the processing unit uses to measure the passage of time.

In one configuration, the memory, which is coupled to the processor in the controller 164, includes a plurality of instructions which, when executed by the processor, causes the system to monitor the passage of time and then generate an alarm when a desired amount of time has passed. The desired amount of time may be equivalent to the shelf life of the stored item. Therefore, in one embodiment, the timing circuits in the processor of the controller 164 are used to determine that a desired amount of time has passed by comparing the passage of time with a time value stored in memory, and then generate an alarm when the difference between the passage of time exceeds the time value stored in memory. The generated alarm may include the delivery of an audio signal to a speaker coupled to the controller 164 and/or a visual prompt to a display (e.g., LCD display, LED displays, CRT, etc.) that is coupled to the I/O components in the controller 164.

In one configuration, the weight sensing device assembly 309 and controller 164 can also be used to automatically order a replacement for the stored items 50 when the measured weight reaches the desired value or the stored item has reached its shelf life as measured by the timing circuit. In one configuration, the controller 164 is able to place an order for a new stored item 50 (e.g., a food item) via ordering the stored component on the Internet 350 using an Internet link 312. The controller 164 may create a list of stored components 50 that need to be ordered and their respective ordering information (e.g., SKU information, weight, size, brand, flavor) using the bar-code reading system 320, information downloaded from the Internet, information entered by the user, information stored in the memory of the controller 164 and using information tracked by a portion of the controller 164 (e.g., shelf life, desired weight). The list may then be delivered to the user via a message sent from the controller 164 using the Internet link 312 (e.g., e-mail, SMS text) or it may be delivered to a printer (not shown) that is coupled to the controller 164.

In one embodiment, the drawer mechanism 100 also includes a vibrating actuator (not shown) that is coupled to the supporting member 150 and is adapted to assure that components within a stored item 50 that is disposed on the supporting member 150 remain in a constantly mixed state. This configuration can be useful where the components in the stored item 50 tend to separate over time, such as paint. The vibrating actuator may be a simple unbalance motor, piezoelectric device or other simple vibration or oscillation inducing mechanical device.

In one embodiment, two or more drawer mechanisms 100 can be coupled together to allow for a series of separate extensions to be performed so that the user can more easily access the contents of a stored item 50 disposed on the topmost drawer mechanism 100. In one configuration, the base 103 of a second drawer mechanism 100 is attached to the supporting member 150 of a first drawer mechanism 100, so that the two drawer mechanisms act independently and in series to lift a stored item 50 positioned on the supporting member 150 of the second drawer mechanism 100. In one configuration, a single controller 164 is configured to control both the first and second drawer mechanisms 100.

Figure 12:
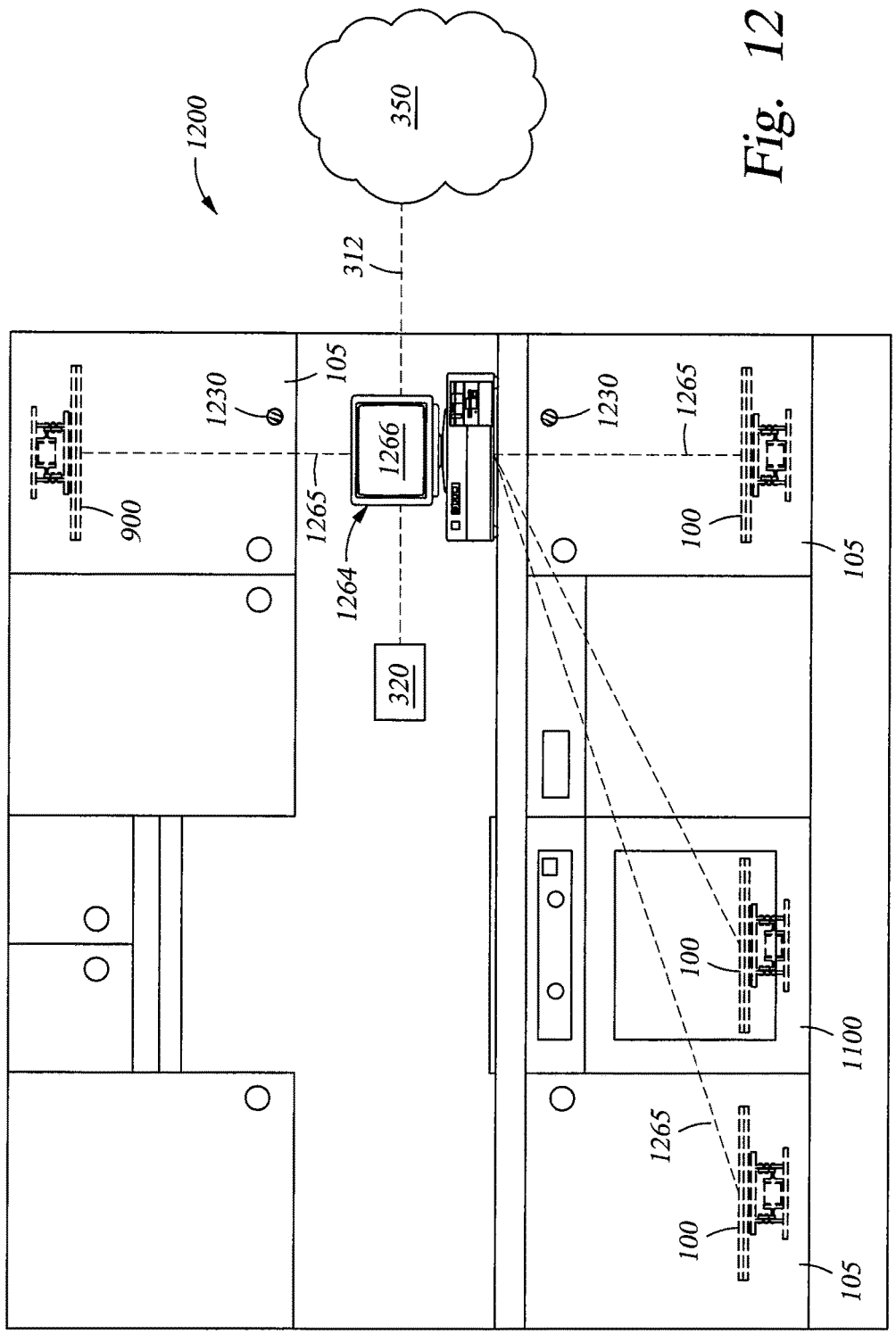
FIG. 12 illustrates a room that contains a plurality of drawer mechanisms that are each in communication with a central controller, according to another embodiment of the invention.

In another embodiment, as illustrated in FIG. 12, one or more drawer mechanisms 100, 700, 900 are configured to communicate with a central controller 1264 that is adapted to control and manage aspects of the use of one or more of the drawer mechanisms 100, 700, 900 that are coupled thereto. FIG. 12 illustrates a kitchen 1200 that contains a plurality of drawer mechanisms 100, 700 and 900 that are each in communication with the central controller 1264 via a wired or wireless link 1265. In one embodiment, the links 1265 may be wireless links in which a transceiver coupled to the central controller 1264 is in wireless communication with a wireless transceiver in each of the drawer mechanisms. The wireless transceiver in each the drawer mechanism 100, 700, 900 may be coupled to, i.e., in communication with, one or more of the electronic components in the drawer mechanism 100, 700, 900, so that a command sent from the central controller 1264 can be carried out by a drawer mechanism and sensors in the drawer mechanism can send data back to the central controller 1264. For example, the central controller 1264 may send an "extend" command to the drawer mechanism to cause the actuator in the drawer mechanism to move the support member 150 from a retracted position to an extended position and one or more position sensors in the drawer mechanism can send data back to the central controller 1264 to let the central controller 1264 know that the action was started and/or has been completed.

While a kitchen 1200 is illustrated in FIG. 12, this configuration is not intended to be limiting as to the scope of the invention described herein, since a central controller 1264 and one or more drawer mechanisms 100, 700, 900 can be used in other locations, such as in a garage, a warehouse, or other similar residential or industrial location(s) that may use one or more drawer mechanisms. In one configuration, the central controller 1264 is in communication with the bar-code reader 320, the Internet 350, the weight-sensing device assembly 309 (FIG. 3) and actuating mechanism 160

(FIG. 3) on each drawer mechanism 100, 700, 900. In one embodiment, each of the plurality of drawer mechanisms do not have their own controller 164, but all use the central controller 1264 to complete all of the tasks that the controller 164 was adapted to perform within each drawer mechanism. In this way all of the redundant features found in the plurality of drawer mechanisms 100, 700, 900 are eliminated and the cost of the overall system can be reduced. The central controller 1264 may be a general-purpose computer, tablet or similar computing device that contains all of the components discussed above in conjunction with the controller 164.

In one embodiment, the central controller 1264 is configured to monitor and keep track of the inventory of the stored components 50 within the kitchen 1200. In one example, the position of the stored component 50 on the drawer mechanism 100, 700, 900 is input into the central controller 1264, so that the central controller 1264 can monitor its current weight, shelf life and other useful information. Information relating to stored component can then be retrieved and delivered to the user via a display 1266 or other similar means. In some configurations, part of the information stored in memory about a stored item 50 can be created from information received from the bar code information retrieved by the bar-code reader system.

In some embodiments, the central controller 1264 can allow a user to find items stored within the kitchen 1200 by inputting desired information about the item into a software application running within the central controller 1264. The software application then looks up the position of the item in the kitchen 1200 and then causes the drawer mechanism on which this item resides to extend to a desired position, and/or provide some notification of the item's position to the user, so that the user can more easily retrieve the item. In one configuration, the notification can include turning on a light 1230 (e.g., LED light) that is positioned at the enclosing structure 105 in which the drawer mechanism is positioned. The light 1230 can be coupled to I/O components and a switch (not shown) that form part of the central controller 1264.

In another embodiment, the central controller 1264 is configured to help confirm the presence and find a compiled list of different stored components 50 on different drawer mechanisms 100, 700 and/or 900 within the kitchen 1200. Thus, the central controller 1264 can also determine if there is enough of a certain ingredient using the weight-sensing device assembly 309, which is in communication with the central controller 1264. In one configuration, if the user has a recipe (or bill-of-materials) from which they would like to prepare, for example, dinner, the central controller 1264 can use the current inventory list and tracked status of each ingredient on the recipe to provide input to the user as to what is missing and needs to be ordered. In one embodiment, the central controller can automatically order the missing item(s) using a communication signal sent through the Internet link 312. In one embodiment, the central controller 1264 can download a user-selected recipe from the Internet via the Internet link 312 (or use a user input recipe), then determine whether the ingredients in the recipe are stored within the kitchen, then create a list of missing ingredients and/or order the missing ingredients.

Embodiment of the invention may further provide a computer readable storage medium disposed within the controller 164, or central controller 1264, comprising instructions that in response to execution by a processor cause the processor to perform operations, comprising receiving information about a stored item 50 from a bar code reader 320, starting a timer that is configured to monitor the passage of time (e.g., countdown timer), monitoring the passage of time until at least an alarm event time is reached, monitoring a weight of the stored item 50, which is disposed on a supporting member 150 using a weight-sensing device assembly 309, over time, and generating an alarm when the alarm event time has been reached or the weight of the stored item 50 is less than a desired value stored in the computer readable storage medium of the controller 164, or central controller 1264. The alarm event time may be based on the information received from the bar code reader 320 and/or a shelf-life value stored in the computer readable storage medium. Generating the alarm may comprise delivering an audio signal to a speaker or a visual prompt generated on a display coupled to the system controller.

One skilled in the art will appreciate that the discussion above regarding a recipe and ingredients could also be adapted for use in a more industrial application where the recipe would be the bill-of-materials and the ingredients would be the actual parts stored in a bin on a drawer mechanism 100, 900. Therefore, a system containing a central controller 1264 and one or more drawer mechanisms 100, 700, 900 could be useful in a warehouse, pharmacy, shipping service (e.g., FedEx®, UPS), post office or other similar application where parts are stored and retrieved.

While the foregoing is directed to embodiments of the present invention, other and further embodiments of the invention may be devised without departing from the basic scope thereof, and the scope thereof is determined by the claims that follow.

The invention claimed is:

1. An apparatus for positioning supported components, comprising:
 a first drawer lifting mechanism that comprises:
  two or more linkage structures that each comprise a plurality of linkage bars;
  a supporting member having a supporting surface, wherein the supporting member is disposed on or coupled to a first linkage bar of the plurality of linkage bars; and
  a first actuator assembly having an output shaft that is coupled to a second linkage bar of the plurality of linkage bars, and is adapted to move the supporting member from a first position to a second position by changing the orientation of the second linkage bar;
 a system controller that is in communication with the first actuator, and comprises a processor;
 a weight sensing assembly that is configured to measure the weight of an object disposed on the supporting member and provide information relating to the measured weight to the system controller;
 a memory having stored therein a number of instructions which, when executed by the processor, causes the apparatus to perform operations comprising:
  counting from a first time to a second time using a timing circuit, wherein the object is positioned on the weight sensing assembly while the timing circuit counts from the first time to the second time; and
  generating the alarm when the difference between the first time and the second time exceeds a time value stored in memory, wherein generating the alarm comprises delivering an audio signal to a speaker or a visual prompt generated on a display coupled to the system controller; and
 a bar-code reading system that is configured to provide information about the object disposed on the supporting member when a bar code disposed on the object is scanned by the bar-code reading system, wherein the time value stored in memory is derived from the information provided from the bar-code reading system.

2. The apparatus of claim 1, wherein the plurality of linkage bars further comprise:
a driven linkage bar that is rotationally coupled to a driven axis;
a second linkage bar that is rotationally coupled to a base structure;
a third linkage bar that is rotationally coupled to the base structure;
a fourth linkage bar that is rotationally coupled to the second linkage bar, the third linkage bar and the driven linkage bar; and
wherein the first linkage bar is rotationally coupled to the second linkage bar and the third linkage bar.

3. The apparatus of claim 2, wherein the driven bar, first bar, second bar, third bar and fourth bar each comprise a bar, rod or i-beam.

4. The apparatus of claim 1, wherein the two or more linkage structures of the first drawer lifting mechanism are disposed within a processing region of an oven.

5. The apparatus of claim 1, wherein the processor is further configured to cause the apparatus to perform the operations comprising:
measuring the weight of the object at a third time and a fourth time using the weight sensing assembly and the timing circuit; and
generating an alarm when the difference between the weight measured at the third time and the weight measured at the fourth time exceeds a weight value, wherein generating the alarm comprises delivering an audio signal to a speaker or a visual prompt generated on a display coupled to the system controller.

6. The apparatus of claim 1, further comprising:
a memory having stored therein a number of instructions which, when executed by the processor, causes the apparatus to perform operations comprising:
measuring the weight of the object at a third time and a fourth time using the weight sensing assembly; and
generating the alarm when the difference between the weight measured at the third time and the weight measured at the fourth time exceeds a weight value, wherein generating the alarm comprises delivering an audio signal to a speaker or a visual prompt generated on a display coupled to the system controller.

7. The apparatus of claim 6,
wherein the bar-code reading system is further configured to provide information about the object disposed on the supporting member to the system controller when the bar code disposed on the object is scanned by the bar-code reading system, wherein the weight value is derived from the information provided from the bar-code reading system.

8. The apparatus of claim 1, further comprising:
a bar-code reading system that is configured to provide information about the object disposed on the supporting member to the system controller when a bar code disposed on the object is scanned by the bar-code reading system.

9. The apparatus of claim 1, further comprising:
a second drawer lifting mechanism that comprises:
two or more linkage structures that each comprise a plurality of linkage bars;
a supporting member having a supporting surface, wherein the supporting member is disposed on or coupled to a first linkage bar of the plurality of linkage bars; and
a second actuator assembly having an output shaft that is coupled to a second linkage bar of the plurality of linkage bars, and is adapted to move the supporting member from a first position to a second position by changing the orientation of the second linkage bar; and
a wireless transceiver that is in communication with the processor and a first wireless transceiver coupled to the first actuator assembly and a second wireless transceiver coupled to the second actuator assembly.

10. An apparatus for positioning supported components, comprising:
a first drawer lifting mechanism that comprises:
two or more linkage structures that each comprise a plurality of linkage bars;
a supporting member having a supporting surface, wherein the supporting member is disposed on or coupled to a first linkage bar of the plurality of linkage bars; and
a first actuator assembly having an output shaft that is coupled to a second linkage bar of the plurality of linkage bars, and is adapted to move the supporting member from a first position to a second position by changing the orientation of the second linkage bar;
a system controller that is in communication with the first actuator, and comprises a timing circuit and a processor;
a weight sensing assembly that is configured to measure the weight of an object disposed on the supporting member and provide information relating to the measured weight to the system controller;
a bar-code reading system that is configured to provide information about the object to the system controller when a bar code disposed on the object is scanned by the bar-code reading system; and
a memory having stored therein a number of instructions which, when executed by the processor, causes the apparatus to perform operations comprising:
monitoring a characteristic of the object over a period of time; and
generating the alarm when the monitored characteristic exceeds a value stored in memory, wherein generating the alarm comprises delivering an audio signal to a speaker or a visual prompt generated on a display coupled to the system controller.

11. The apparatus of claim 10, wherein the two or more linkage structures of the first drawer lifting mechanism are disposed within a processing region of an oven.

12. The apparatus of claim 10, wherein the processor is further configured to cause the apparatus to perform the operations comprising:
counting from a first time to a second time using the timing circuit,
wherein the object is positioned on the weight sensing assembly while the timing circuit counts from the first time to the second time, and
wherein the generating the alarm further comprises generating an alarm when the difference between the first time and the second time exceeds the value stored in memory.

13. The apparatus of claim 12, wherein the processor is further configured to cause the apparatus to perform the operations comprising:

measuring the weight of the object at a first time and a second time using the weight sensing assembly and the timing circuit, and wherein the generating the alarm further comprises generating an alarm when the difference between the weight measured at the first time and the weight measured at the second time exceeds a weight value.

14. The apparatus of claim 10, wherein the monitored characteristic is selected from a group consisting of a change in the weight and an amount of time the object is positioned on the supporting member.

15. An apparatus for positioning supported components, comprising:
- a first drawer lifting mechanism that comprises:
  - a base structure;
  - two or more linkage structures, each of the linkage structures comprising:
    - a driven bar that is rotationally coupled to a driven axis;
    - a first bar that is rotationally coupled to the base structure;
    - a second bar that is rotationally coupled to the base structure;
    - a third bar that is rotationally coupled to the first bar, the second bar and the driven bar; and
    - a fourth bar that is rotationally coupled to the first bar and the second bar;
  - a supporting member that is disposed on the fourth bar, and having a supporting surface; and
  - a first actuator assembly having an output shaft that is coupled to the driven bar and is adapted to move the supporting member from a first position to a second position by changing the orientation of the driven bar;
- a system controller comprising a timing circuit, a first wireless transceiver and a processor, wherein the first wireless transceiver is in communication with a second wireless transceiver that is in communication with the first actuator assembly;
- a weight sensing assembly that is configured to measure the weight of an object disposed on the supporting member and provide information relating to the measured weight to the system controller;
- a bar-code reading system that is configured to provide information about the object disposed on the supporting member when a bar code disposed on the object is scanned by the bar-code reading system; and
- a memory having stored therein a number of instructions which, when executed by the processor, causes the apparatus to perform operations comprising:
  - monitoring a characteristic of the object over a period of time, wherein the monitored characteristic is selected from a group consisting of a change in the weight and an amount of time the object is positioned on the supporting member; and
  - generating the alarm when the monitored characteristic exceeds a value stored in memory, wherein generating the alarm comprises delivering an audio signal to a speaker or a visual prompt generated on a display coupled to the system controller.

16. The apparatus of claim 15, wherein the base structure further comprises a slide or rail.

17. The apparatus of claim 15, wherein the first actuator assembly further comprises a pinion gear that is coupled to the driven bar and a rack gear that is in contact with the pinion gear, wherein the first actuator assembly is adapted to move the supporting member from a first position to a second position when the pinion gear is translated relative to rack gear.

* * * * *